INVENTOR.
B. KEITH BETZ
BY Henry L. Hanson
ATTORNEY

DIGITAL DATA ERROR DETECTION AND CORRECTION APPARATUS

Filed July 12, 1962 4 Sheets-Sheet 2

INVENTOR.
B. KEITH BETZ
BY Henry L. Hanson
ATTORNEY

March 29, 1966 B. K. BETZ 3,243,774

DIGITAL DATA ERROR DETECTION AND CORRECTION APPARATUS

Filed July 12, 1962 4 Sheets-Sheet 3

INVENTOR.
B. KEITH BETZ
BY Henry L. Hanson
ATTORNEY

INVENTOR.
B. KEITH BETZ
BY Henry L. Hanson
ATTORNEY

United States Patent Office 3,243,774

Patented Mar. 29, 1966

3,243,774

DIGITAL DATA ERROR DETECTION AND CORRECTION APPARATUS

Bernard Keith Betz, Hopkins, Minn., assignor to Honeywell Inc., a corporation of Delaware Filed July 12, 1962, Ser. No. 209,454
4 Claims. (Cl. 340—146.1)

A general object of the present invention is to provide a new and improved apparatus useful in manipulating and correcting digital data. More specifically, the present invention is concerned with a new and improved apparatus useful in monitoring information being transferred and providing a means for effecting a correcting operation on information transferred in the event that an error is detected in the data transferred wherein said apparatus makes optimum use of the transfer and checking circuitry for purposes of carrying out the correcting operation.

Data processing systems are widely used for carrying out many varied forms of data manipulation associated with record keeping, arithmetical operations and other similar data processing functions. The data which is handled or manipulated generally takes the form of electrical signals of the on-and-off type, or pulse type, which are arranged in predetermined or preselected combinations to define, in binary-type notation, zeros and ones. These zeroes and ones may in turn represent desired alphanumeric combinations of data.

The handling and manipulation of data in a data processing system may involve, in addition to other things, the transfer of the data between selected parts of the data processing system. For example, many data processing systems have associated therewith bulk storage devices wherein large amounts of digital data are recorded on some magnetic medium such as a magnetic tape. Inasmuch as the transfer of data from a magnetic recording medium into the system involves electro-mechanical functions, there is always the likelihood that an error condition will be created in this transfer due to such things as signal dropout in a particular channel of a multiple-channel circuit. The likelihood of an error occurring is present either in the writing or in the reading operations associated with the data transfer. Inasmuch as large amounts of data are manipulated by data processing systems in relatively short periods of time, it is essential that the occurrence of an error condition not unduly hold up the data processing operation and it is even more desirable that, once an error condition is detected, steps be taken to automatically correct or eliminate the effects of the error condition that may have occurred.

Before it is possible to carry out any data correcting operations in any data processing system, it is first necessary to provide facilities for detecting the presence of an error condition. Representative apparatus which may be used for purposes of checking the presence of errors in data being manipulated will be found in a patent issued to R. M. Bloch on April 7, 1953 and bearing Number 2,634,052. In a further patent of R. M. Bloch issued March 28, 1961, and bearing Number 2,977,047, there is disclosed an apparatus for detecting the presence of errors in data being manipulated and further apparatus for correcting the errors that are detected.

The present invention constitutes an improvement over the foregoing types of apparatus with the improvements relating to the specific manner in which the error detection apparatus is used in an error correction capacity once an error condition has been detected and located.

It is therefore a more specific of the invention to provide a new and improved apparatus which is adapted to utilize error detecting apparatus for error correction purposes.

In a representative type of apparatus using a preferred embodiment of the invention, the data being manipulated is related to data transferred to and from a data storage tape which is adapted to store data in a plurality of channels. The data is arranged in frames which are adapted to be positioned across the recording tape. Associated with each frame is a parity bit which takes the form of a binary one or a zero and represents the modulo 2 summing, without carry, of the data bits appearing in any frame. The data transferred has associated therewith further checking data, or weight count data, which may be used to identify the location of a channel that may be in error. Once a particular channel has been identified as one containing an error, it is possible to transfer the data being manipulated and to utilize the parity generator, associated with the checking circuitry for each frame, as a means for recreating the data in the channel where an error is located.

It is therefore a still further object of the present invention to provide a new and improved error detection and correction apparatus wherein a parity generator is utilized for purposes of identifying the presence of an error and is further utilized for purposes of correcting an error once its location has been identified.

Still another more specific object of the present invention is to provide a new and improved apparatus for transferring a plurality of channels of data having associated therewith a parity channel with means for sensing the occurrence of an error in one of the data channels by generating a partiy bit relating to the data transferring and comparing that data bit with the checking parity bit in the parity channel in combination with further means for locating a particular channel having an error therein and effecting a further transfer of the data so that all of the data from channels other than that having an error therein may be combined with data from the parity channel to recreate the data in the channel having an error therein.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
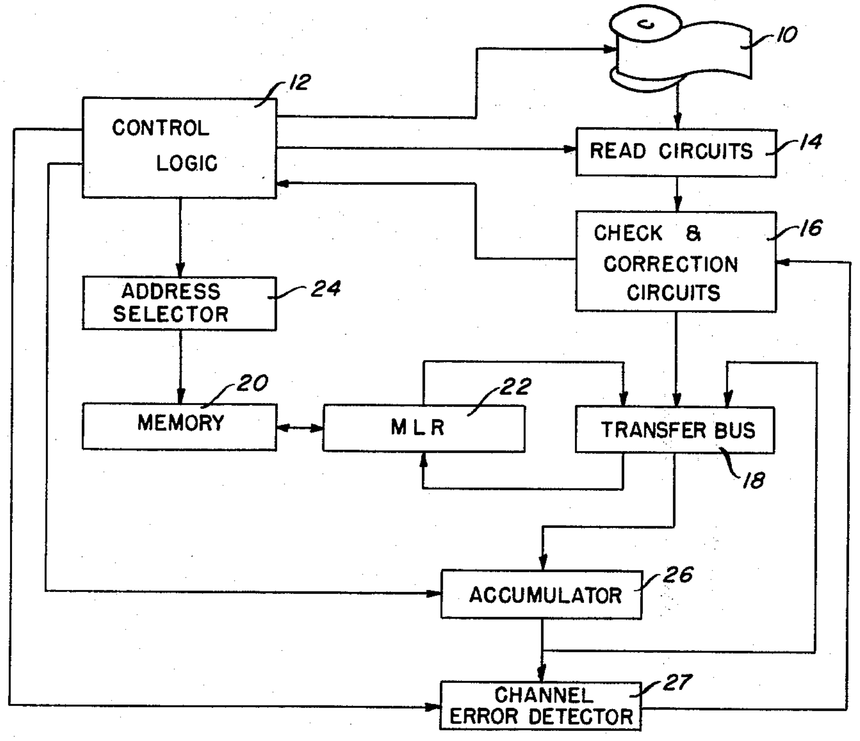
FIGURE 1 is a diagrammatic representation of those portions of a data processing apparatus related to and including the invention.

Considering first the apparatus disclosed in FIGURE 1, there is here illustrated in diagrammatical form the arrangement of the essential parts of a data processing system which may be associated with means for implementing the teachings of the invention. The apparatus illustrated includes apparatus for transferring data and means for checking the presence of errors in the data transferred along with further means for locating and then correcting the errors that have been detected. More specifically, the apparatus of FIGURE 1 comprises a storage tape mechanism indicated generally at 10 which is adapted to store magnetic tape on which data has been recorded by appropriate electro-magnetic means. The control of the reading operation of data from the storage tape 10 is initiated by way of suitable control logic indicated generally at 12. The control logic provides means for activating the movement of the storage tape 10 and the activation of the read circuits which will change the data signals recorded on the tape into electrical signals.

The data representing signals coming out of the read circuits are arranged to be fed into an appropriate check and correction circuit 16 and from there to a transfer bus 18. The transfer bus is arranged to communicate with a memory 20 by way of a memory local register 22. The location of data transferred by way of the transfer bus 18 into the memory 20 will be determined by the appropriate address selection signals derived from the control logic which acts upon an address selector 24.

Also connected to the transfer bus 18 is an accumulator 26, the latter of which is adapted to be examined in its output by way of a channel error detector 27.

Considering the over-all operation of the circuitry of FIGURE 1, it should be understood that the apparatus illustrated is adapted to be a part of an over-all data processing system of the stored program type. In this regard, the control logic circuitry 12 is first assumed to have present therein a read order which directs that the tape mechanism 10 become operative and that the read circuits 14 be activated so that data stored on the tape may be read therefrom with the intent that the data be transferred ultimately to preselected storage locations in the memory 20. As the data is read by the read circuits 14, it passes through the check and correction circuitry 16 to the transfer bus 18 and then into the memory local register 22. The data is then transferred into the memory 20 in sequential storage locations related to the addresses selected in the memory as derived from the read order which initiated the operation.

As the data is being transferred from the read circuits into the transfer bus 18 through the check circuitry 16, an examination is made to determine whether or not the transfers are being made without error. In the event that an error condition is detected, this error condition is stored until the read operation is completed at which time the circuitry steps into a subroutine which will then initiate a correction operation with respect to the data read. The subroutine comprises, as is explained more fully hereinafter, the transfer of all of the data read into the memory during the first read operation into the accumulator 26 wherein a summing process takes place. This operation is used to uniquely identify the channels wherein an error may have occurred.

The output of the accumulator 26 is then passed into a channel error detector 27 and a signal fed back to the correction circuitry to condition the circuitry to perform a correction operation. While the accumulation is going on in the accumulator 26, the control logic steps the tape mechanism back so that the record that had just been read, and in which an error had been detected, will be in position to be read again. As soon as the tape mechanism has been repositioned, the read operation proceeds once again and in this instance the read operation passes the signals through the circuitry 14 and the correction circuit 16. This circuitry has now been rearranged so that the channel which was in error on the first read is effectively gated out of the transfer operation and a substitute channel of data created in place thereof. This substitute data will then be transferred along with the other good channel data for storage in the memory for a subsequent data processing operation. A full understanding of the checking and correction functions carried out in accordance with the present invention will be understood by a more careful consideration of the circuitry discussed below.

In considering the over-all detailed operation of the apparatus for implementing the invention, the manner in which the data is organized in the tape mechanism and within the processing circuitry is first considered. The data being manipulated is considered in terms of a data processing word of fixed-bit length. The word described herein is assumed to be a word of forty-eight bits arranged in a predetermined combinatorial code represented by binary ones and zeros. As there are forty-eight bits of information in each word, it has been found desirable to arrange these bits for recording on magnitude tape in a series of frames each of which comprises eight data bits and a related parity bit. The parity bit represents a modulo 2 summing, without carry, of all of the bits making up the particular frame of data. Thus, with eight bits in each frame, a total of six frames are required in order to carry all of the bits for a full word.

Table 1 below illustrates the arrangement of the bits by number in a word along with the parity bits. Thus, on a magnetic tape having the data recorded thereon, there will be a total of eight data channels and an accompanying parity channel for carrying the information and related checking data.

*Table 1*

| Frames | 8 data channels | | | | | | | | 1 parity channel |
|---|---|---|---|---|---|---|---|---|---|
| 1 | 1 | 2 | 5 | 6 | 9 | 10 | 13 | 14 | 49 |
| 2 | 3 | 4 | 7 | 8 | 11 | 12 | 15 | 16 | 50 |
| 3 | 17 | 18 | 21 | 22 | 25 | 26 | 29 | 30 | 51 |
| 4 | 19 | 20 | 23 | 24 | 27 | 28 | 31 | 32 | 52 |
| 5 | 33 | 34 | 37 | 38 | 41 | 42 | 45 | 46 | 53 |
| 6 | 35 | 36 | 39 | 40 | 43 | 44 | 47 | 48 | 54 |

Records which are stored on a magnetic tape generally comprise a number of words. For purposes of considering the nature of the present invention, the record is assumed to comprise two words each of which is forty-eight bits in length. Table 2 below shows two such words along with the related bit positions. Also shown in Table 2 is a check word. This check word is assumed to be a word which has been generated by the modulo 2 summing, without carry, of corresponding bits which make up a record. Thus, bit position 1 of the check word represents the mudulo 2 summing of bit positions 1 in each of words 1 and 2.

*Table 2*

| | Bit positions | | | | | | | |
|---|---|---|---|---|---|---|---|---|
| | 1 | 2 | 3 | 4 | 5 | 6 | 7 | 8 |
| Word 1 | 0 | 1 | 1 | 0 | 0 | 1 | 0 | 1 |
| Word 2 | 1 | 0 | 0 | 1 | 0 | 1 | 1 | 1 |
| Check word | 1 | 1 | 1 | 1 | 0 | 0 | 1 | 0 |
| | 9 | 10 | 11 | 12 | 13 | 14 | 15 | 16 |
| Word 1 | 0 | 0 | 0 | 1 | 0 | 1 | 0 | 0 |
| Word 2 | 0 | 0 | 0 | 1 | 1 | 1 | 0 | 0 |
| Check word | 0 | 0 | 0 | 0 | 1 | 0 | 0 | 0 |
| | 17 | 18 | 19 | 20 | 21 | 22 | 23 | 24 |
| Word 1 | 0 | 0 | 1 | 0 | 1 | 1 | 0 | 0 |
| Word 2 | 0 | 0 | 0 | 1 | 0 | 1 | 1 | 0 |
| Check word | 0 | 0 | 1 | 1 | 1 | 0 | 1 | 0 |
| | 25 | 26 | 27 | 28 | 29 | 30 | 31 | 32 |
| Word *1* | 0 | 1 | 0 | 1 | 1 | 0 | 0 | 1 |
| Word 2 | 0 | 1 | 0 | 0 | 1 | 0 | 1 | 1 |
| Check word | 0 | 0 | 0 | 1 | 0 | 0 | 1 | 0 |
| | 33 | 34 | 35 | 36 | 37 | 38 | 39 | 40 |
| Word 1 | 0 | 1 | 0 | 1 | 1 | 0 | 1 | 1 |
| Word 2 | 0 | 1 | 1 | 0 | 0 | 1 | 0 | 0 |
| Check word | 0 | 0 | 1 | 1 | 1 | 1 | 1 | 1 |
| | 41 | 42 | 43 | 44 | 45 | 46 | 47 | 48 |
| Word 1 | 0 | 0 | 1 | 0 | 1 | 1 | 0 | 1 |
| Word 2 | 1 | 0 | 1 | 0 | 0 | 1 | 0 | 1 |
| Check word | 1 | 0 | 0 | 0 | 1 | 0 | 0 | 0 |

The arrangement of the data appearing in Table 2 on magnetic tape will be in the form set forth in Table 3 below. Thus, each word will be seen to comprise six frames of data extending across eight data channels. A parity channel is also associated with each of the frames and, as pointed out above, this comprises the mudulo 2 summing, without carry, of all of the bits representing data in each frame. As the manner in which the record is actually written on magnetic tape, other than format, is not a part of the present invention, the details of the writing circuitry have been omitted from the present discussion. However, it will be recognized by those skilled in the art that various types of magnetic recording schemes may be utilized in writing information so that it may be electro-magnetically stored on a magnetic tape and subsequently read.

*Table 3*

| | 8 data channels | | | | | | | | 1 parity channel | Frames |
|---|---|---|---|---|---|---|---|---|---|---|
| | 1 | 2 | 3 | 4 | 5 | 6 | 7 | 8 | | |
| Word 1 | 0 | 1 | 0 | 1 | 0 | 0 | 0 | 1 | 1 | 1 |
| | 1 | 0 | 0 | 1 | 0 | 1 | 0 | 0 | 1 | 2 |
| | 0 | 0 | 1 | 1 | 0 | 1 | 1 | 0 | 0 | 3 |
| | 1 | 0 | 0 | 0 | 0 | 1 | 0 | 1 | 1 | 4 |
| | 0 | 1 | 1 | 0 | 0 | 0 | 1 | 1 | 0 | 5 |
| | 0 | 1 | 1 | 1 | 1 | 0 | 0 | 1 | 1 | 6 |
| Word 2 | 1 | 0 | 0 | 1 | 0 | 0 | 1 | 1 | 0 | |
| | 0 | 1 | 1 | 1 | 0 | 1 | 0 | 0 | 0 | |
| | 0 | 0 | 0 | 1 | 0 | 1 | 1 | 0 | 1 | |
| | 0 | 1 | 1 | 0 | 0 | 0 | 1 | 1 | 0 | |
| | 0 | 1 | 0 | 1 | 1 | 0 | 0 | 1 | 0 | |
| | 1 | 0 | 0 | 0 | 1 | 0 | 0 | 1 | 1 | |
| Check word | 1 | 1 | 0 | 0 | 0 | 0 | 1 | 0 | 1 | |
| | 1 | 1 | 1 | 0 | 0 | 0 | 0 | 0 | 1 | |
| | 0 | 0 | 1 | 0 | 0 | 0 | 0 | 0 | 1 | |
| | 1 | 1 | 1 | 0 | 0 | 1 | 1 | 0 | 1 | |
| | 0 | 0 | 1 | 1 | 1 | 0 | 1 | 0 | 0 | |
| | 1 | 1 | 1 | 1 | 0 | 0 | 0 | 0 | 0 | |

The present invention is primarily concerned with being able to recognize errors in data being transferred from tape into the memory of the associated system, and the further ability to make corrections when errors have been detected, a representative example is discussed here to facilitate a better understanding of the logical circuitry which is discussed below. By way of example, it is assumed that the data appearing in Table 3 is transferred from tape to the memory. It is further assumed that in the process of this transfer, a series of bits are lost from a particular channel, namely channel 4 of the data being transferred. Further, in channel 4, it is assumed that the three bits that are lost, or not recognizable, are the bits appearing in frames 1, 2 and 3. By reference to Table 1, it will be seen that these three bits will be identified in the word as bits 6, 8 and 22.

During the transfer from the tape mechanism to the memory, an examination is made to determine the parity accuracy of the data transferred. Thus, each frame will be examined and a modulo 2 sum of the data in each frame will be compared with the parity bit from the parity channel to determine if there is an agreement. In the present example, a parity error will be detected with respect to frames 1, 2 and 3 of word 2. Insofar as the utilizing circuitry is concerned, the detection of a parity error in a frame will be insufficient, by itself, to identify the particular channel wherein an error has occurred. Consequently, further steps must be taken to identify the location of any such error.

The half-adding, or adding mudulo 2, without carry, of the bits in each word and the bits in the check word will result in a one appearing in any bit position wherein there is a lack of parity.

In the assumed example, bit 6 in word 2 is assumed to have been transposed from a one into a zero. Consequently, the adding of the one in bit position 6 of word 1 to the zero from word 2 and the zero from the check word will result in a one appearing in the sum. A similar result will appear with respect to bit 8 and with respect to bit 22. Inasmuch as each of these three bits falls in the same channel, namely channel 4, appropriate steps may then be taken to go through a correcting operation. The correcting operation involves a further transfer of the data from the tape to the memory. In the process of this transfer, the fact that channel 4 had errors therein is stored and the operation of the circuitry is modified accordingly.

With the fact stored that channel 4 contains an error, it is possible to gate out channel 4 in a further transfer from the tape mechanism back into the memory. By half-adding, or adding modulo 2 without carry, the data in each of the good channels, along with the parity channel, the resultant sum will represent the data that should be appearing in channel 4. Thus, noting the first frame of word 2, the mod 2 summing of the data in channels 1 through 3 and 5 through 8 with the bit on the parity channel will result in a one. Similarly, the mod 2 summing of the bits in channels 1 through 3 and 5 through 8 in frame 2 with the parity channel bit for frame 2 will again result in a one being produced in channel 4. In frame 3, word 2, the mod 2 summing of the bits in channels 1 through 3, 5 through 8 and the parity bit will result in a further one being produced which may then be inserted in the appropriate position in channel 4.

Figure 2:
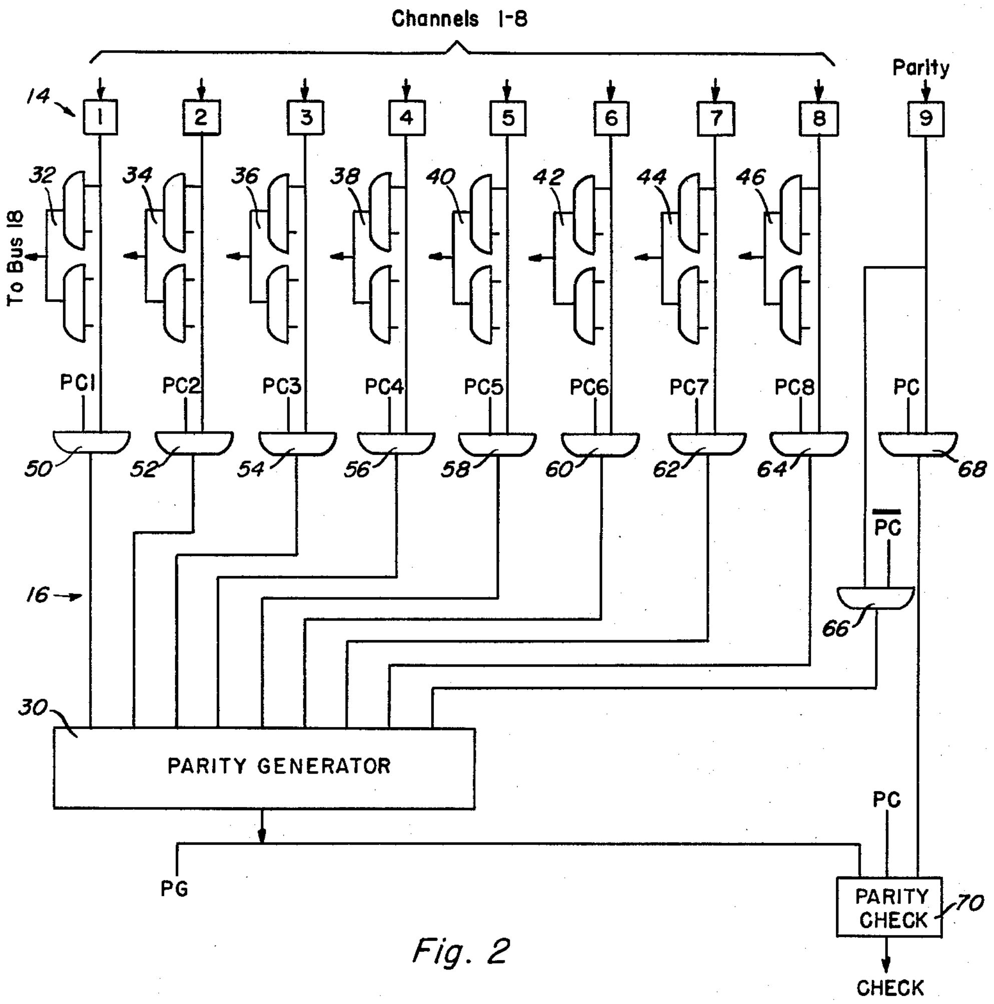
FIGURE 2 is a diagrammatic representation of the logical circuitry associated with the checking and correction facilities of the invention.

Considering next the detailed operation of the circuitry, reference should first be made to FIGURE 2. Here, the read circuits 14 are shown connected to the check and correction circuitry 16, the latter of which has an output which is adapted to be fed to a transfer bus, such as referred to in FIGURE 1. The outputs from the read circuits 14 are arranged to be supplied to two separate gating circuits. The first gating circuit is one which is used for controlling the flow of information from the read circuits to the bus 18 and the other circuit is used for controlling the application of the data signals and the parity signals to a parity generator 30. The parity generator may be of any well-known type which is capable of producing the modulo 2 sum, without the carry, of a plurality of input operand bits.

The gating circuitry coupling each of the channels of the read circuits to the bus 18 is indicated at 32, 34, 36, 38, 40, 42, 44 and 46. The controlling of input to the parity generator is by way of a further set of gates 50, 52, 54, 56, 58, 60, 62, 64 and 66. A further gate 68 is arranged to control the flow of parity bit from the parity input circuit channel to a check circuit gate 70, the latter which also is adapted to receive an input from the parity generator 30 and the parity check flip-flop PC, to be discussed below in connection with FIGURE 4.

Figure 3:
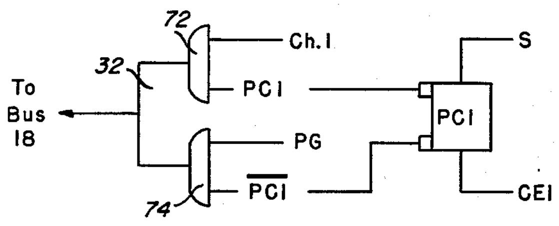
FIGURE 3 is a logical diagrammatic representation of the output of the transfer circuitry shown in FIGURE 2.

Each of the gating circuits which connect the individual channel reading circuits to the bus 18 may be of the type illustrated more specifically in FIGURE 3. In FIGURE 3, the gating section 32 will be seen to comprise two separate AND gating circuits 72 and 74. The input to the gate 72 is the output of the reading circuit for channel 1 and the output from that parity check flip-flop PC1, the latter of which is adapted to be switched to the reset state prior to the normal reading operation by means not shown. The gate 74 will be seen to be an AND gate having an input PG which represents an output signal from the parity generator 30. The other input to the gate 74 is the negation output of the parity check flip-flop PC1, this output being activated upon the occurrence of a channel error as indicated by the presence of a signal CE1.

It will be apparent from a consideration of FIGURE 3 that in the event a normal parity check of the operation is going on, the gate 72 will be opened by the signal PC1 and the signals from the channel 1 read circuitry will pass to the bus 18.

In the normal read operation, that is, the first time that a record of information is being read by way of the read circuitry 14, the data will come in from the read circuitry and will pass directly out to the bus 18. At the same time, the data will be examined by way of the parity generator 30 which will produce, for each frame transferred, a parity bit in accordance with the input data bits from channels 1 through 8. The resultant output of the parity generator 30 will then be compared with the parity check bit coming in from channel 9 by way of gate 68. Upon the appearance of the proper output from the parity generator 30 and a related parity check bit, a check signal will be produced to indicate that a transfer of that particular frame has been made without error.

As each frame of each word is transferred into the memory 20 of FIGURE 1, the word may be assembled so that all of the 48 data bits making up the word may be stored in a single address location. The word assembly process may be effected under program control by a series of transfers and shifts as will be well understood by those skilled in the art.

After all the words of the record, including the check word, are transferred into the memory, it may be desirable to go through a correction routine if an error condition has been sensed in checking the parity of the individual frames of each word transferred. This checking operation may be carried on by way of the circuitry illustrated in FIGURE 4. Each of the words read in the memory may be programmed into the accumulator for a half-add type of accumulation. This half-adding operation may be carried out using standard programming techniques wherein the suppression of carry between bit positions within the accumulator is carried out during the adding or accumulating process. All of the record words and the check words will be transferred into the accumulator in the course of this half-adding operation. The half-adding operation will result in zeros appearing in all bit positions wherein there are no errors associated with the transfer. In the event that an error condition is detected, a one will appear in the bit position in the accumulator to identify the particular bit found to be in error.

Figure 4:
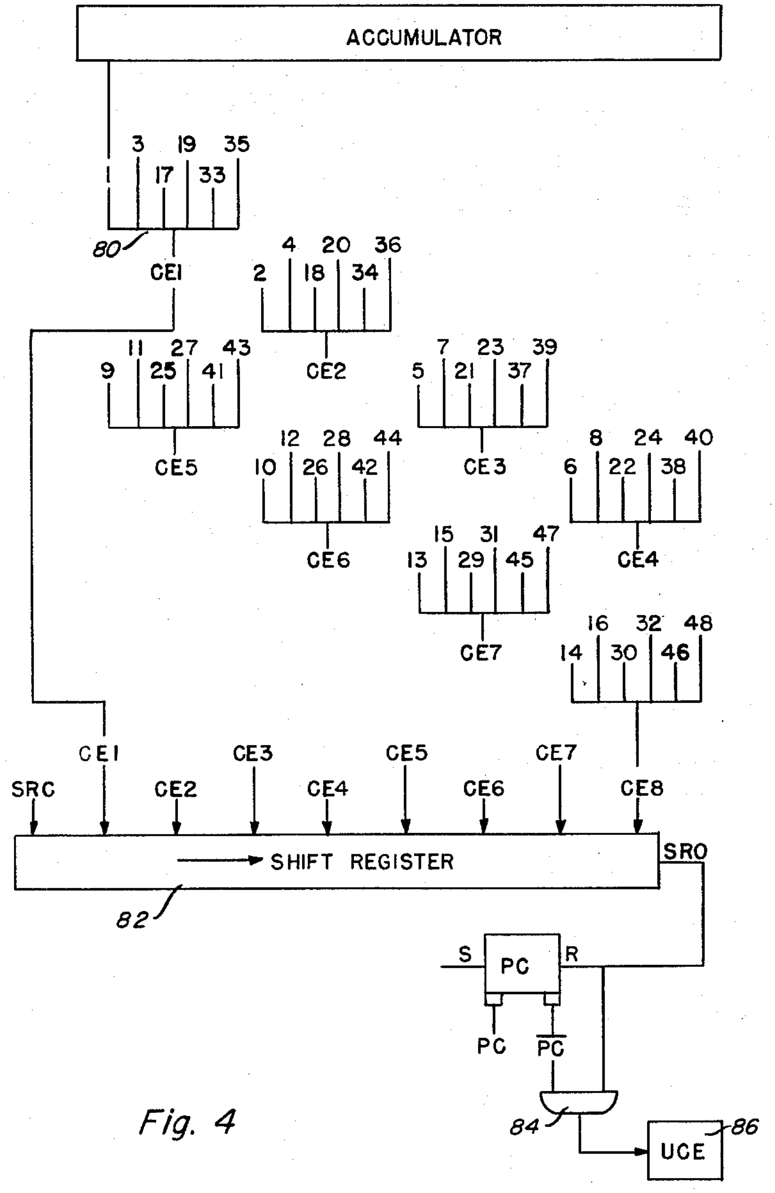
FIGURE 4 shows illustrative logical circuitry for identifying error locations.

The apparatus in FIGURE 4 is adapted for connection to the output of the accumulator. Here a total of eight separate OR gates or buffer circuits are provided. Thus, referring to Table 1, the bit positions associated with channel 1 are bits 1, 3, 17, 19, 33 and 35. As viewed in FIGURE 4, the bit position in the accumulator corresponding to channel 1 are all buffered together on the OR gate 80. The presence of an output of gate 80 will indicate the presence of a channel error in channel 1, the channel error being indicated by the channel error signal CE1. Similar inputs will be seen to be provided on a further series of OR gating circuits for producing error signals related to the channels 2 through 8.

The channel error signals CE1 though CE8 are adapted for connection to an appropriate shift register 82 which is adapted to store the presence of an indicated error signal in any particular channel. Shift register 82 has an output SRO which is arranged for connection to a parity check-flip-flop PC. This parity flip-flop PC is normally switched in the set state and is arranged to be switched to the reset state upon the application of a signal from the shift register 82. When the flip-flop PC is switched into the reset state by an output signal from the shift register 82, the negation output $\overline{PC}$ will become active on an AND gate 84 so that upon the appearance of a further signal from the shift register 82, a signal will be passed to the gate 84 to an uncorrectable channel error indicator circuit 86, the latter of which may also take the form of a flip-flop or other similar signal storage device.

It will be noted in the circuitry of FIGURE 4 that as long as there is only one channel in error, even though there may be a multiplicity of errors in that particular channel, only one output signal will appear on the output of the shift register 82. In the event that two or more channels are found to be in error, the particular correction technique explained herein will not be applicable and resort must be had to other correcting means such as described in the aforementioned Bloch Patent Number 2,977,047.

A shift register complete signal SRC is provided on the output of the shift register 82. This signal is first inserted in the register and shifted out after any channel error signals CE are inserted and shifted. Thus, when the shift register 82 has completed its operation, the SRC signal will appear and will condition a gate 102 in FIGURE 5 so that a further tape read operation can be initiated.

Figure 5:
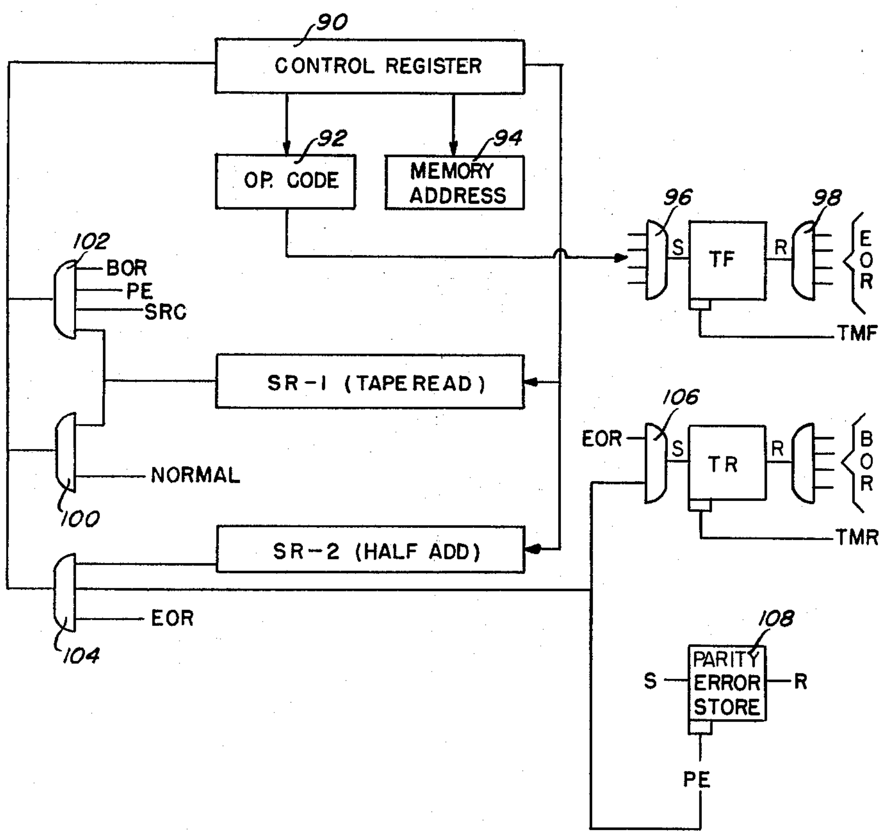
FIGURE 5 is a diagrammatic representation of the basic control logic associated with implementing the teachings of the present invention.

Referring next to FIGURE 5, there is here illustrated representative control logic that may be utilized in accordance with the teachings of the present invention. As the control logic will generally be related to the type of data processing system with which the invention is used, it will be obvious to those skilled in the art that only those parts essential to the performance of the present invention are discussed herein and the details of a complete data processing system of the general-purpose type will be, of course, dependent upon the over-all types of order structure incorporated in the system.

FIGURE 5 illustrates at 90, a control register which is adapted to contain an order which is being performed by the associated data processing system. The control order will generally take the form of a system word where certain ones of the bits making up the word define the type of operation that is to be performed. These bits are sometimes referred to as the operation code and will be appropriately interpreted by operation code circuitry such as indicated generally at 92. Other bits making up the control word stored in the control register are bits identifying address location or address locations with respect to an operation which is to be performed. The address bits will be appropriately interpreted by a memory address circuit 94, the latter of which is adapted to provide a signal for the address selector 24, shown in FIGURE 1. Associated with the output of the operation code circuit 92 is a tape control flip-flop TF which is adapted to direct that the tape move forward by producing the signal TMF when the flip-flop has been set. Setting of this circuit will be determined by the sensing of a predetermined operation code on the input gate 96 which receives the code signals from the operation code circuit 92. The resetting of the flip-flop TF may be by way of an end-of-record signal EOR appropriately gated to the reset side of the circuit TF by way of a gate 98. The EOR signal may take the form of coded information on the tape being controlled.

A pair of shift registers SR1 and SR2 are provided for purposes of storing control orders that may be used in performing the operations to be carried out in accordance with the teachings of the invention. For example, the shift register SR1 may store a tape read order and this tape read order is adapted to be gated out of this shift register SR1 by way of a gate 100 under normal operating conditions, or by way of a gate 102 under special operating conditions. One of the input signals for the gate 102 is a beginning-of-run signal BOR, while further inputs are PE (Parity Error) and SRC (Shift Register Complete).

The shift register SR2 may be adapted to contain a half-add order which is used especially for activating the accumulator when the location of channel errors is to be determined. The order stored in the shift register SR2 is adapted to be gated out by way of further gate 104 when a parity error condition has been sensed and an end-of-record signal EOR has been detected. A tape reverse flip-flop TR is provided and this flip-flop is adapted to be set upon the occurrence of a parity error signal PE and an end-of-record signal EOR, said signals being gated into the set side of the flip-flop TR by way of the gate 106. The resetting of the tape reverse flip-flop TR may be by way of beginning-of-record signals BOR also derived from the tape mechanism. The output of the tape reverse flip-flop is a tape move reverse TMR signal. Also included in this circuitry shown in FIGURE 5 is a parity error store flip-flop 108, this latter circuit being adapted to be set by an output signal produced by the parity check circuitry of FIGURE 2. Once set, the circuit will remain set until such time as a reset signal is applied to indicate that the correcting operation has been completed.

As with the end-of-run signals EOR, the beginning-of-run signals BOR may be derived from the data recorded at the beginning of a record on tape and especially sensed by gating means responsive to the codes selectively identifying the function at hand.

It will be further understood that the control orders that are associated with the functions of tape reading and half-adding may well be stored in the system memory and called out by special subsequencing program orders.

The over-all operation of the apparatus with reference to the above-described example is considered next. It is assumed first that a tape read order has been inserted into the control register 90 in the course of a normal program operation. Thus, the tape read order from the shift register SR1 may be shifted out through the gate 100 into the control register 90 so that this order will be the next order performed. A sensing of the tape read operation code by way of the circuitry 92 will be effective to activate the gate 96 and set the tape forward flip-flop TF to produce the tape move forward signal TMF. The TMF signal will then, in turn, activate the tape transport and the read circuitry 14, shown on FIGURE 1, so that data on the tape, as represented in Table 3, will begin coming in through read circuitry 14 to the transfer bus 18.

The read circuitry will pass the signals through the check in the correction circuits 16 to the transfer bus 18 in the manner illustrated in connection with FIGURE 2. This first transfer will result in all of the data channels being transferred to the transfer bus 18 and the transfer of each frame will be accompanied with a parity check which is performed by way of the parity generator 30 and the parity check circuits 70. In the event that a parity error is detected in connection with any frame of any of the words transferred, the resultant parity check signal will be stored in the parity error store circuit 108 of FIGURE 5. As soon as the parity error store circuit 108 has been activated, and the record transfer has been completed, as indicated by the appearance of an end-of-record signal EOR, the gate 106 on the input of the tape reverse flip-flop TR will be activated. This will effect a movement of the tape mechanism 10 back to its starting point at the beginning of the record. At the same time as the tape transport is moving back to the starting point of the record, the half-add order stored in the shift register SR2 will be read out by way of the gate 104 into the control register 90 and this half-add order will then effect the adding of the data read in previously. This half-adding operation will take place in the accumulator 26 with the words being read from the sequential address locations which were related to the address locations from the original tape read order.

Upon completion of the half-adding operation, the output of the accumulator is examined by the circuitry of FIGURE 4 to determine which channel is in error and if more than one channel error has occurred. Assuming, as in the above example, that errors have occurred in channel 4, the signal CE4 will be dropped into the shift register 82 and upon the completion of the shifting of the shift register 82, the shift register output SRO will pass to the parity check flip-flop PC, the latter of which will now switch to the reset state. When the parity check circuit PC has been reset, the signal $\overline{PC}$ will appear on the gate 66. The gate 68 will now be closed and the circuit will be conditioned to go through a further read operation. The next read operation will be by way of the tape read order which will cause the incoming data to once again come in by way of the read circuits 14. The gating circuitry 38 will now be effective so that the read circuit for channel 4 will not pass its output directly to the bus 18. Further, the flip-flop PC4 will have been reset so that no signal from channel 4 can be applied to the parity generator 30.

As the second reading operation proceeds, the data from channels 1 through 3 and 5 through 8, as well as the parity channel data, will pass into the parity generator 30 where a parity bit PG will be produced. The parity bit on the output of the generator 30 will then be coupled into the bus 18 by way of the gating circuitry 38. Thus, after the read operation which has been completed, the new or substitute channel 4 has been created from the other information and parity information so as to eliminate the error condition that has been indicated present in channel 4.

It will be apparent that the appearance of errors in other than the described channel may be appropriately corrected using the apparatus described above. It will further be apparent that the logic of the system may be arranged so that parity channels may be associated with every other data channel and thus a correction technique may be applied to channel errors in excess of one. The implementation of such an arrangement would obviously involve the duplication of the techniques described above in connection with a single parity channel.

It will also be apparent from a consideration of the foregoing specification that there has been illustrated and described a new and improved apparatus useful in detecting and correcting certain types of errors that may be encountered in transfer apparatus associated with an electronic data processing system.

While, in accordance with the provisions of the statutes, there has been illustrated and described the best forms of the invention known, it will be apparent to those skilled in the art that changes may be made in the apparatus described without departing from the spirit of the invention, as set forth in the appended claims, and that, in some cases, certain features of the invention may be used to advantage without a corresponding use of other features.

Having now described the invention, what is claimed as new and novel and for which it is desired to secure by Letters Patent is:

1. Apparatus for use in manipulating a multiple-channel record having a parity channel associated therewith comprising a plurality of data input channels and a parity input channel, a parity generator, means connecting said data input channels to said parity generator to produce a parity bit from the data on said data input channels, a parity check circuit connected to the output of said parity generator and said parity input channel, means connected to said parity check circuit for sensing a parity error, means including said sensing means operatively connected to said data input channels to identify a data input channel having an error therein, means connected to said means including said error-sensing means to retransfer the data from said data input channel and said parity input channel to the input of said parity generator, said last named means further connected to said parity generator input to gate out data from said data input channel having an error therein, and means connecting signals from the output of said parity generator representative of corrected data to replace the data from said channel having an error therein.

2. An error detection and correction apparatus for monitoring and correcting data manipulated by a multiple-channel data transfer circuit comprising a plurality of data transfer channels, a parity transfer channel, a parity generator, means including said parity generator connected to said transfer circuit to identify a data transfer channel in error, means activated upon detection of an error in one of said data transfer channels to operatively connect said parity transfer channel and all of said data transfer channels except the transfer channel in error to the input of said parity generator, and means connecting signals from the output of said parity generator representative of corrected data to replace the data from said channel in error.

3. An error detection and correction apparatus for monitoring and correcting data manipulated by a multiple-channel data transfer circuit comprising a plurality of data transfer channels, a parity transfer channel, a parity generator, means connecting said data transfer channels to said parity generator to produce an output from the data on said data transfer channels, means checking the output of said parity generator with a signal from said parity transfer channel, means connected to said transfer circuit to identify a data transfer channel in error, means connected to said last named means and said checking means when an error is detected to retransfer the data from said parity transfer channel and all of said data transfer channels except the transfer channel in error to the input of said parity generator, and means connecting signals from the output of said parity generator representative of corrected data to replace the data from said channel in error.

4. Apparatus for use in transferring from a tape storage means a multiple-channel record having a parity channel asssociated therewith comprising a plurality of data input channels and a parity input channel adapted to be activated when data is called for from said storage means, a parity generator, means connecting said data input channels to said parity generator to produce a parity bit from the data transferred on said data input channels, a parity check circuit connected to the output of said parity generator and said parity input channel, means connected to said parity check circuit to sense a parity error, means connected to be activated by said sensing means to identify a data input channel having an error therein, means connected to said error sensing means and to said last named means to effect a retransfer of all the data and parity inputs related to that data where an error was detected to the input of said parity generator, means connected to said parity generator input to gate out data from said data input channel having an error therein, and means connecting signals from the output of said parity generator representative of corrected data to replace the data from said channel having an error therein.

References Cited by the Examiner

UNITED STATES PATENTS

| | | | |
|---|---|---|---|
| 2,977,047 | 3/1961 | Bloch | 235—153 |
| 3,114,130 | 12/1963 | Abramson | 340—146.1 |
| 3,142,829 | 7/1964 | Comstock | 340—174.1 |
| 3,144,635 | 8/1964 | Brown et al. | 340—146.1 |
| 3,183,483 | 5/1965 | Lisowski | 340—146.1 |

MALCOLM A. MORRISON, *Primary Examiner.*

ROBERT C. BAILEY, *Examiner.*

M. P. ALLEN, *Assistant Examiner.*